(12) United States Patent
Hu et al.

(10) Patent No.: US 11,108,417 B2
(45) Date of Patent: Aug. 31, 2021

(54) VARIABLE-RATE DECODER-BASED WIRELESS RECEIVER

(71) Applicant: HUAWEI TECHNOLOGIES CO., LTD., Guangdong (CN)

(72) Inventors: Lan Hu, Ottawa (CA); Sai Mohan Kilambi, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 16/511,214

(22) Filed: Jul. 15, 2019

(65) Prior Publication Data

US 2021/0021289 A1    Jan. 21, 2021

(51) Int. Cl.
*H04B 1/00* (2006.01)

(52) U.S. Cl.
CPC ......... *H04B 1/0035* (2013.01); *H04B 1/0025* (2013.01); *H04B 1/0046* (2013.01); *H04B 2201/70703* (2013.01)

(58) Field of Classification Search
None
See application file for complete search history.

(56) References Cited

U.S. PATENT DOCUMENTS

| 6,597,526 B1 | 7/2003 | Gray | |
| 2005/0025251 A1* | 2/2005 | Chang | H04B 14/066 375/246 |
| 2009/0196182 A1* | 8/2009 | Barnett | H04L 47/24 370/236.1 |
| 2016/0329949 A1* | 11/2016 | Cloutier | H04B 7/0885 |

FOREIGN PATENT DOCUMENTS

| CN | 101277285 A | 10/2008 |
| CN | 201699698 U | 1/2011 |
| WO | 2017053057 A1 | 3/2017 |
| WO | 2019202414 A1 | 10/2019 |

OTHER PUBLICATIONS

Francois Rivet et al. An Ultra Wide Band Analog-to-Digital Converter based on a Delta-Riemann architecture, 2016 IEEE. Total 4 pages.
International Search Report and Written Opinion of PCT/CN2020/102034; Shuiying Yl; dated Sep. 28, 2020.

* cited by examiner

*Primary Examiner* — Ajit Patel
*Assistant Examiner* — Pamit Kaur
(74) *Attorney, Agent, or Firm* — BCF LLP

(57) ABSTRACT

The disclosed systems, structures, and methods are directed to a wireless receiver. The configurations presented herein employ a structure operative to receive a plurality of analog signals, a signal encoding configured to encode the plurality of received analog signals into a single encoded analog composite signal based on a coding scheme having a low code rate, a signal reconstruction module configured to convert the single encoded digital composite signal into a high encode rate digital composite signal in accordance with the coding scheme having a high code rate. In addition, a signal decoder configured to decode the digital composite signals based on the coding scheme having the high code rate and to output digital signals corresponding to the received plurality of analog signals.

20 Claims, 11 Drawing Sheets

VARIABLE-RATE DECODER-BASED WIRELESS RECEIVER

CROSS-REFERENCE TO RELATED APPLICATIONS

This is the first application filed for the instantly disclosed technology.

FIELD OF THE INVENTION

The present invention generally relates to the field of wireless communication system and, in particular, to a wireless communication receiver employing variable-rate decoding techniques to provide reduced clock rate, power consumption and signal bandwidth for efficient use of hardware and software processing resources.

BACKGROUND

Various wireless communication systems are configured to receive multiple analog signals that have been previously encoded and modulated. These multiple analog signals may then be combined using a code having a higher frequency than the modulation frequency of the analog signals. This combination of analog signals yields an output signal that is spread across a wide bandwidth. The use of high code rates to spread the data signals enables the sharing of receiver hardware resources by combining multiple input signals to a single signal before being sampled by analog-to-digital (ADC) converter, while also providing a greater resistance to interference as well as promoting increased reliability (e.g., lower error vector magnitude (EVM) values).

However, it will be appreciated that the encoding of multiple analog signals at a higher code rate presents certain challenges to wireless receiver systems. One such challenge is that such receiver systems need to employ hardware, software, and firmware elements that are capable of operating at higher speeds to properly process the high code rate signals.

These challenges may be exacerbated by certain proposed enhancements to existing wireless communication systems as well as next-generation wireless communication designs. Such enhancements and designs include the deployment of high speed encoder, high sampling rate ADCs to sample high code rate signals, etc. Such enhancements and designs potentially strain the receiver hardware and software processing resources that are currently implemented.

SUMMARY

An object of the present disclosure is to provide a wireless receiver for processing analog signals. The disclosure presented herein employs a structure operative to receive a plurality of analog signals. A signal encoder configured to encode a plurality of received analog signals into a single encoded analog composite signal, in accordance with an orthogonal coding scheme operated at a first code rate. An analog-to-digital converter configured to convert the single encoded analog composite signal into a single encoded digital composite signal containing constituent digital signals. A signal reconstruction module configured to convert the single encoded digital composite signal into a high encode rate digital composite signal in accordance with the orthogonal coding scheme operated at a second code rate. A signal decoder configured to decode the high encode rate digital composite signal in accordance with the orthogonal coding scheme operated at the second code rate, to output a plurality of digital signals.

In accordance with other aspects of the present disclosure, the receiver wherein the signal reconstruction module comprises an alias generator configured to generate fundamental spectrum and spectral images of the single encoded digital composite signal, a spectrum extractor configured to extract a desired positive frequency spectrum and a desired negative frequency spectrum from fundamental spectrum and spectral images of the single encoded digital composite signal in accordance with the second code rate, a rate change filter configured to change the sampling rate of the desired positive frequency spectrum and the desired negative frequency spectrum, a spectrum allocation module configure to perform a shifting operation on the desired positive frequency spectrum and the desired negative frequency spectrum in accordance with a tuning frequency, a spectrum construction module configured to combine the shifted, desired positive frequency spectrum and the shifted, desired negative frequency spectrum.

In accordance with other aspects of the present disclosure, there is provided a method of processing wireless received signals. The disclosure presented herein operates to receive a plurality of analog signals and encodes the plurality of received analog signals into a single encoded analog composite signal in accordance with an orthogonal coding scheme operated at a first code rate, converting the single encoded analog composite signal to a single encoded digital composite signal containing constituent digital signals, reconstructing the single encoded digital composite signal into a high encode rate digital composite signal in accordance with the orthogonal coding scheme operated at a second code rate and decoding the high encode rate digital composite signal in accordance with the orthogonal coding scheme having the second code rate, to output a plurality of digital signals.

In accordance with other aspects of the present disclosure, the method of processing signals wherein the signal reconstruction module comprises generating fundamental spectrum and spectral images of the single encoded digital composite signal, extracting a desired positive frequency spectrum and a desired negative frequency spectrum from fundamental spectrum and spectral images of the single encoded digital composite signal in accordance with the second code rate, changing the sampling rate of the desired positive frequency spectrum and the desired negative frequency spectrum, shifting the desired positive frequency spectrum and the desired negative frequency spectrum in accordance with a tuning frequency, combining the shifted, desired positive frequency spectrum and the shifted, desired negative frequency spectrum.

BRIEF DESCRIPTION OF THE FIGURES

The features and advantages of the present disclosure will become apparent from the following detailed description, taken in combination with the appended drawings, in which.

Figure 1:
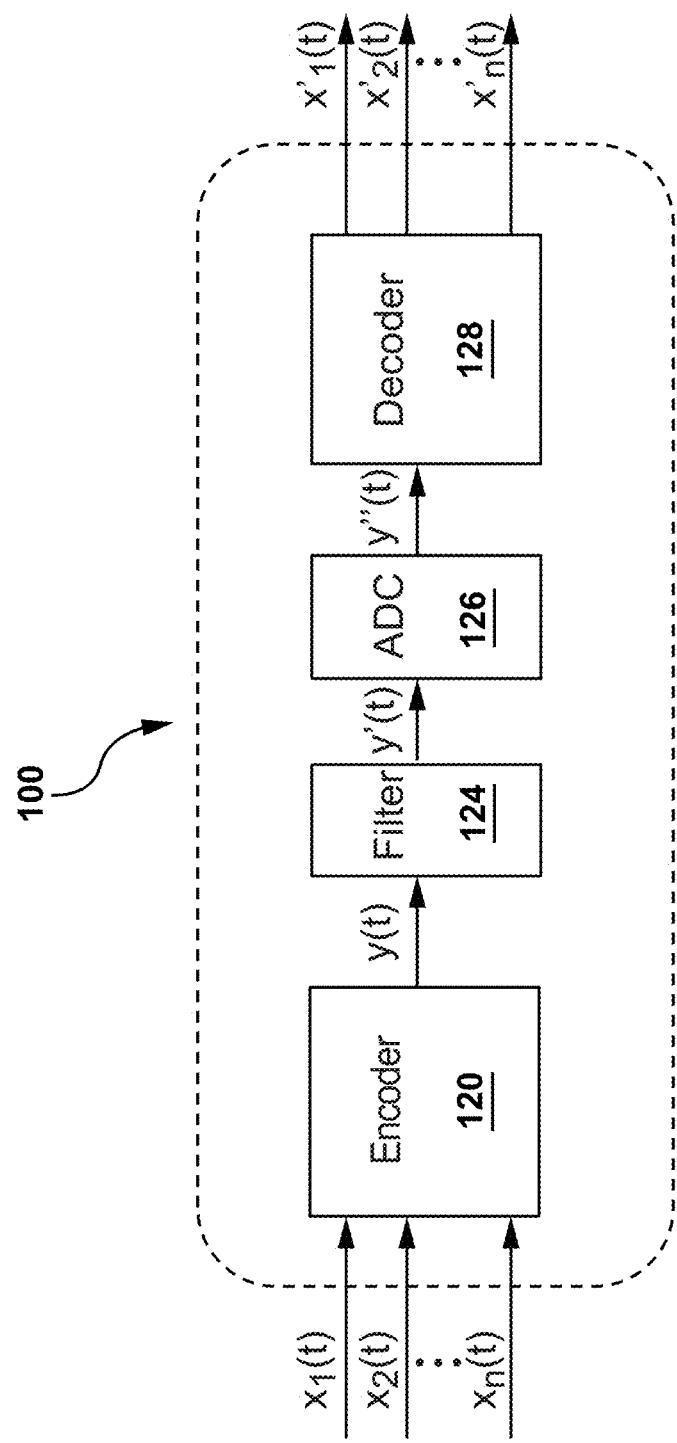
FIG. 1 (Prior Art) depicts a high-level functional block diagram of a conventional wireless communication receiver.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain.

FIG. 1 illustrates a functional block diagram of a conventional wireless receiver architecture 100 directed to processing received analog signals. The conventional wireless receiver architecture 100 includes an encoder module 120, a filter 124, an analog-to-digital converter (ADC) 126, and a decoder module 128. Other elements may be present but not illustrated for purposes of tractability and simplification.

As illustrated by FIG. 1, conventional wireless receiver architecture 100 receives n analog input signals $x_1(t)$, $x_2(t) \ldots x_n(t)$, which may be received by one or more antenna structures (not shown), such as, for example, MIMO/M-MIMO antennas. It will be understood that each of the received signals may possess different modulation/encoding characteristics.

As shown, the n analog input signals $x_1(t)$, $x_2(t) \ldots x_n(t)$ are forwarded to encoder module 120. Encoder module 120 is configured to encode and convert the n analog input signals $x_1(t)$, $x_2(t) \ldots x_n(t)$ into a single, composite, encoded analog signal y(t). Signal y(t) is encoded at a higher rate than the rate of any of of the n analog input signals $x_1(t)$, $x_2(t) \ldots x_n(t)$, in accordance with a spread-coding scheme implemented by encoder module 120.

In particular, the encoding operation of encoder module 120 is accomplished by mixing the analog input signals $x_1(t)$, $x_2(t) \ldots x_n(t)$ with a spread-coding scheme. The outputs of the mixing operation may be subsequently combined to yield a single analog composite signal y(t).

It will be appreciated that the spread-coding scheme may be based on any number of different types of codes such as orthogonal codes or pseudo noise PN sequences such as, for example, Walsh, Hadamard, Gold, Barker codes, etc. These codes exhibit desirable coding characteristics and may be implemented at a substantially higher frequency rate than the rates of received analog input signals $x_1(t)$, $x_2(t) \ldots x_n(t)$. In so doing, encoder module 120 outputs a single, composite, high-rate analog signal y(t) that is effectively spread across a wide frequency bandwidth.

As illustrated in FIG. 1, the encoded analog composite signal y(t) may be provided to an anti-aliasing filter 124 to attenuate the higher frequencies components and prevent the aliasing components from being sampled. The anti-aliasing filter may comprise a low-pass filter or a band-pass filter with suitable cut-off frequencies. By having a single analog signal y(t) output by encoder 120, only a single filter 124 is needed, instead of having a plurality of input signals $x_1(t)$, $x_2(t) \ldots x_n(t)$ requiring a corresponding plurality of filters.

The filtered, encoded analog composite signal y'(t) may then be supplied to a high bandwidth analog-to-digital converter ADC module 126, which operates to convert the filtered version of analog composite signal y'(t) into a digital composite signal y"(t).

The digital composite signal y'(t) may then be subsequently transmitted for further processing, such as, for example, decoding operations performed by decoder module 128. The decoder module 128 processes digital composite signal y'(t) to decode and separate the digital composite signal y'(t) into constituent n digital signals $x'_1(t)$, $x'_2(t) \ldots x'_n(t)$ that encompass the desired information contained by the originally-received n analog input signals.

In particular, decoder module 128 receives and processes digital composite signal y'(t) by mixing the digital composite signal y'(t) with the same spread-coding scheme at the same rate as that was used in encoder 120 in the encoding of the originally-received analog input signals $x_1(t)$, $x_2(t) \ldots x_n(t)$. The resulting mixed samples may be then integrated to generate n digital signals $x'_1(t)$, $x'_2(t) \ldots x'_n(t)$.

As noted above, wireless receiver architecture 100 requires hardware and software processes, such as, for example, the encoder 120, ADC 122 and other components, to operate at high processing speeds to accommodate the processing of the encoded, high-rate, wideband signals.

Figure 2:
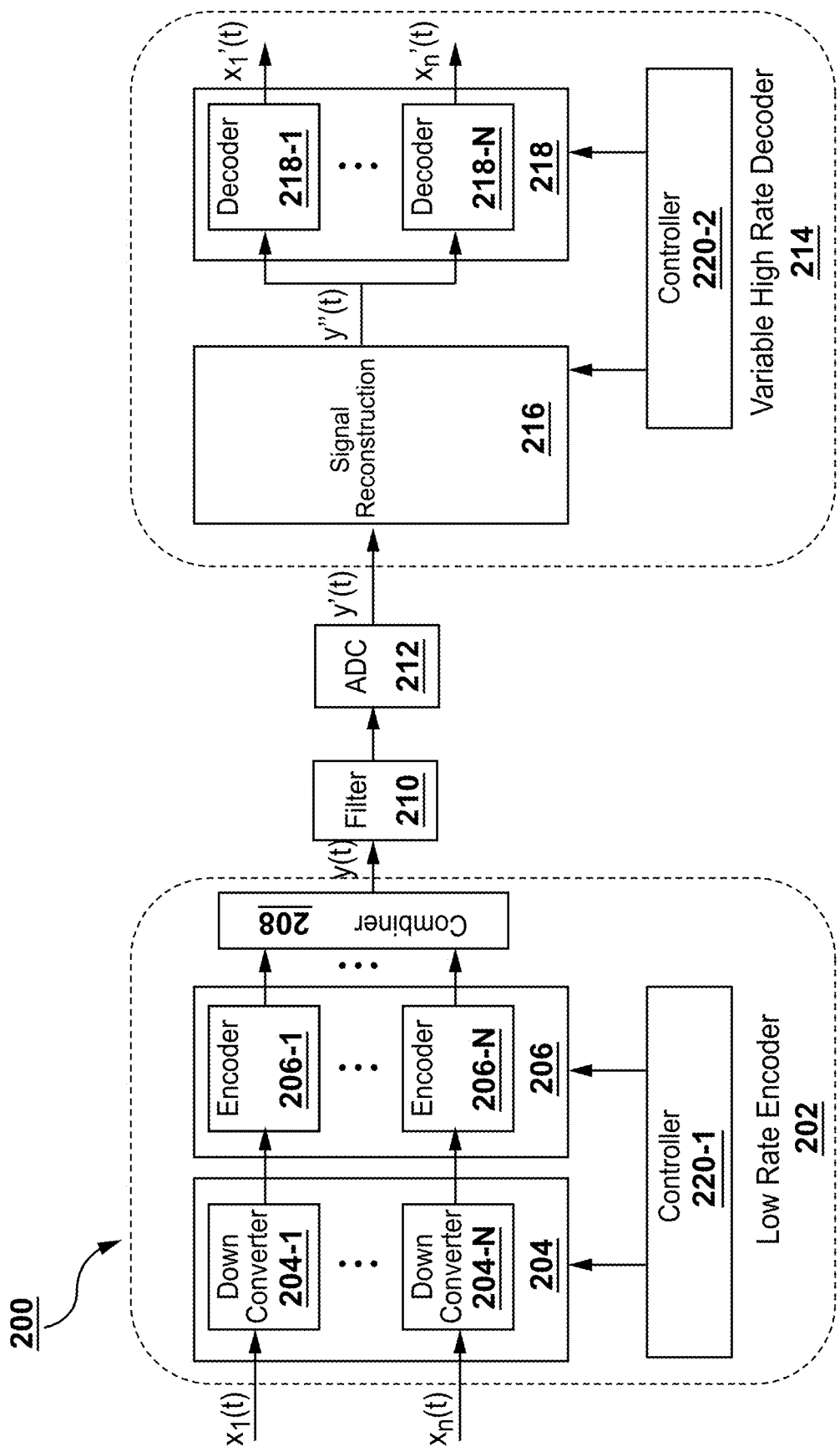
FIG. 2 depicts a high-level functional block diagram of a representative variable-rate decoder-based wireless receiver, in accordance with various embodiments of the present disclosure.

FIG. 2 depicts a functional block diagram of variable-rate decoder-based wireless receiver 200, in accordance with various embodiments of the present disclosure. As shown, variable-rate decoder based wireless receiver 200 employs a low-rate encoder 202, a filter 210, an ADC 212, and a variable high rate decoder 214. Other elements may be present but not illustrated for purposes of tractability and simplicity.

As will be understood in view of the ensuing descriptions and, in accordance with various embodiments of the present disclosure, the implementation of a low-rate encoder 202 in conjunction with a variable high rate decoder 214 operates to effectively reduce high encoding rate requirements while maintaining data recovery integrity. In so doing, variable-rate decoder receiver 200 can be implemented with a substantially relaxed requirements for hardware/software processing speeds, power consumption and bandwidth required to otherwise accommodate the processing of the encoded, high-rate, wide-band signals.

Moreover, consistent with various embodiments of the present disclosure, it will be appreciated that some or all of the noted elements of variable-rate decoder-based wireless receiver 200, such as, for example, low-rate encoder 202, filter 210, ADC 212, and variable high rate decoder 214, may be implemented by combinations of at least one of software, firmware and either general purpose or dedicated hardware constructs to facilitate integration with existing receivers.

With this said, as depicted in FIG. 2, low-rate encoder 202 employs a down converter 204, an encoder 206, a combiner 208, and a controller 220-1. The low-rate encoder 202 receives the n analog input signals $x_1(t), x_2(t) \ldots x_n(t)$ and is configured to encode and convert the n analog input signals $x_1(t), x_2(t) \ldots x_n(t)$ into a single, composite, encoded analog signal y(t), in accordance with a spread-coding scheme that is configured to have a code rate much lower than the required code rate. For example, the code rate for the spread-coding scheme may be based on a baseband signal rate instead of the higher modulated rate of the n received analog input signals $x_1(t), x_2(t) \ldots x_n(t)$. Such an encoding will enable envelope signal encoding. In so doing, the n analog input signals $x_1(t), x_2(t) \ldots x_n(t)$ are encoded at a lower rate, thereby resulting in a composite, encoded analog signal y(t) having a reduced bandwidth that accommodates and allows for reduced hardware and software speed requirements.

In accordance with the embodiment illustrated in FIG. 2, the n analog input signals $x_1(t), x_2(t) \ldots x_n(t)$ received by low-rate encoder module 202 are supplied to a down converter module 204. Down converter module 204 employs a bank of individual down converters 204-1, 204-2 . . . 204-N to generate frequency signals and operate to shift the input signals to an intermediate frequency (IF) by mixing the input signals with generated frequency signals. The n IF-shifted input signals are then forwarded to encoding module 206. Encoder 206 further employs a bank of individual encoders 206-1, 206-2 . . . 206-N. Each of the individual encoders 206-1 . . . 206-N act to encode a down-converted version of a corresponding input signal. This allows each of the individual encoders 206-1 . . . 206-N to use a spread-coding scheme at a code rate much lower than the code rate that would be required by encoder 120 of FIG. 1. Each of the individual encoders 206-1 . . . 206-N operates to encode one of the n IF-shifted input signals by mixing the IF-shifted input signal with the low-rate spread-coding scheme to generate a respective spread-shifted version of the corresponding input signal. The spreading of the input signals expands the bandwidth of each of the input signals. The shifted and spread input signals are then forwarded to combiner unit 208, which operates to combine the shifted and spread n input signals $x_1(t), x_2(t) \ldots x_n(t)$ into a single analog composite signal y(t).

The single, analog composite signal y(t) may then be provided to a filter, such as anti-aliasing filter 210. An anti-aliasing filter will restrict the bandwidth of interest as well as mitigate signal components that may lead to aliasing effects. The filtered, single analog composite signal may then be supplied to analog-to-digital converter ADC module 212, which operates to convert the filtered version of analog composite signal y(t) into a digital composite signal y'(t).

Returning to FIG. 2, the digital composite signal y'(t) may then be forwarded to variable high rate decoder 214. Variable high rate decoder 214 may be situated at the same physical location as that of low-rate encoder 202 or may be located at a remote location. The communication between low-rate encoder 202 and variable high rate decoder 214 may be accomplished by any suitable means, such as, for example, by wired connections or wireless facilities. Variable high rate decoder 214 may further employ a signal reconstruction module 216, a decoder 218, and a controller 220-2.

As illustrated, variable high rate decoder 214 is configured to provide the signal y'(t) to signal reconstruction module 216. Signal reconstruction module 216 then convert the received digital composite signal y'(t) by updating the encoding rate of the digital composite signal y'(t) into a high encoding rate using a spectrum re-allocation technique. Specifically, the updated encoding rate is configured, for example, to be [k×4+1] times the lower encoding rate, in which the value of k can be any positive integer number. In this manner, the individual frequency components of the received digital composite signal y'(t) that is encoded at a lower encoding rate may be shifted to new frequency locations of the expected encoded rate. This movement of frequency components allows decoder 218 to operate at a higher decoding rate which, in turn, leads to maintaining the performance of variable-rate decoder based wireless receiver 200, as if the analog input signals $x_1(t), x_2(t) \ldots x_n(t)$ were encoded at a higher encoding rate.

It will be appreciated that the functionality and encoding/decoding schemes of low-rate encoder 202 and variable high rate decoder 214 may be configured and controlled by controllers 220-1 and 220-2 respectively. Controllers 220-1 and 220-2 are configured to store and supply operational control parameters to various modules of low-rate encoder 202 and variable high rate decoder 214, respectively, based on intended receiver service requirements, applications, and designs. To this end, and in accordance with various embodiments of the present disclosure, controllers 220-1 and 220-2 may include a memory storage device to properly store control parameter data as well as a processing device to execute and communicate the control parameter data to relevant modules. It should also be understood that in some embodiments, controllers 220-1 and 220-2 may be communicatively coupled to each other, either directly or through another controller.

For example, controller 220-1 may provide various configuration and control parameters, such as intermediate frequency data to down converter 204, at which analog input signals $x_1(t), x_2(t) \ldots x_n(t)$ are shifted prior to encoding. Both code type, and low encoding rate may be provided by controller 220-1 to encoder 206, so that encoders 206-1 to 206-N can each encode the respective IF-shifted input signals, etc. Similarly, controller 220-2 operates to supply configuration and controlling parameters to various modules of variable high rate decoder 214 in order to ensure proper module functionality. It will be understood that controllers 220-1 and 220-2 may be operated as a single controller controlling low-rate encoder 202 and variable high rate decoder 214. Such operational alternatives do not, in any way, limit the scope of the present disclosure.

Figure 3:
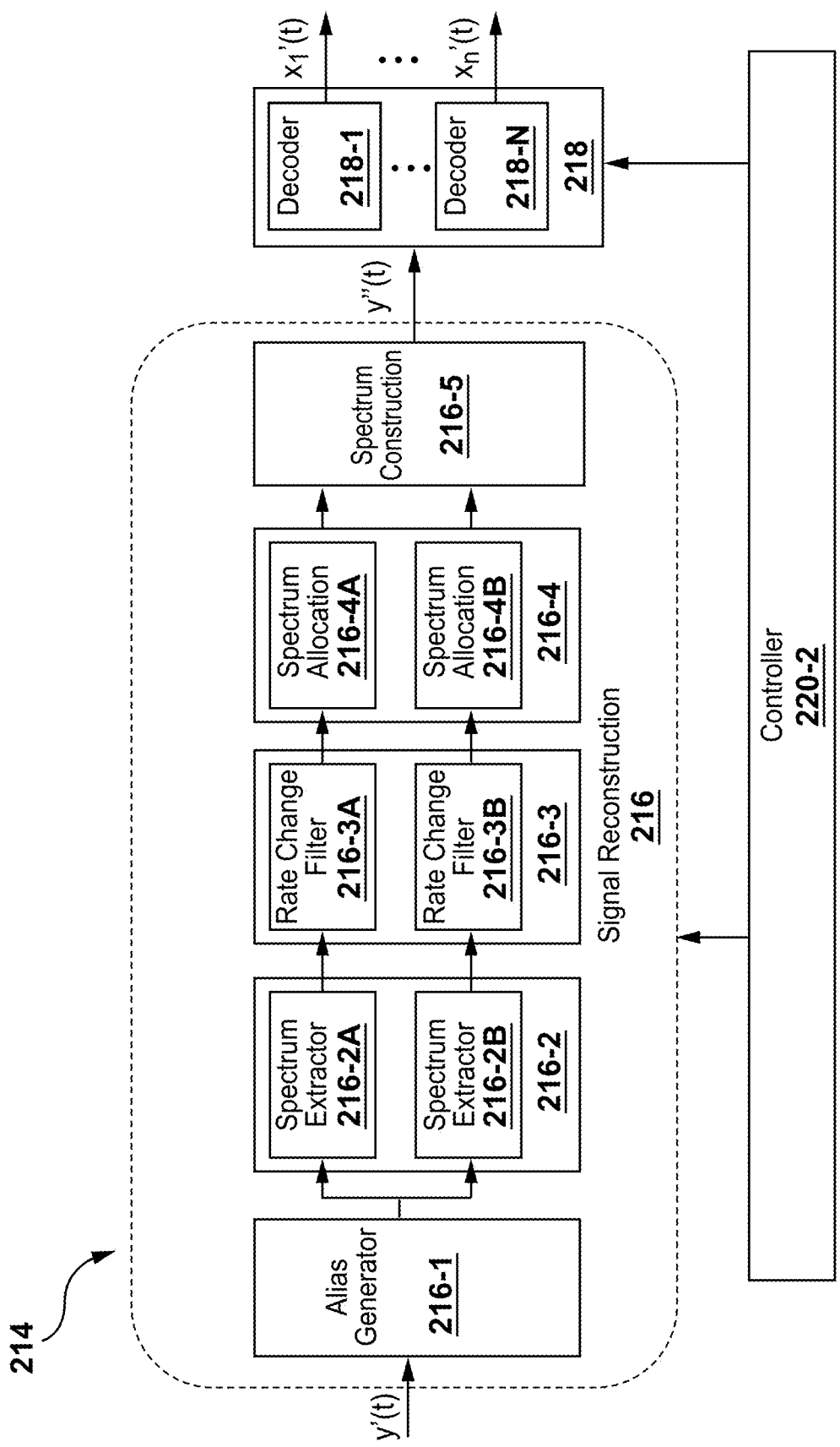
FIG. 3 depicts a high-level functional block diagram of a representative variable high rate decoder, in accordance with various embodiments of the present disclosure.

FIG. 3 provides a more detailed functional diagram of variable high rate decoder 214, in accordance with various embodiments of present disclosure. As shown, signal reconstruction module 216 comprises an alias generator 216-1, a spectrum extractor 216-2, a rate change filter 216-3, a spectrum allocation module 216-4, and a spectrum construction module 216-5.

In the illustrated embodiment, the received digital composite signal y'(t) by variable high rate decoder module 214 is provided to generator 216-1. Alias generator 216-1 is configured to generate the fundamental spectrum and spectral images of the received digital composite signal y'(t). These fundamental spectrum and spectral images of digital composite signal y'(t) may then be provided to spectrum extractor module 216-2. Spectrum extractor module 216-2 is configured to extract the spectrum in accordance with the updated encoding rate, as provided by controller module 220-2.

The extracted spectrum of digital composite signal y'(t) may then be supplied to rate change filter 216-3. Rate change filter 216-3 is configured to change the sampling rate of extracted spectrum of digital composite signal y'(t), in order to make the sampling rate of extracted spectrum of digital composite signal y'(t) consistent with the decoding rate. The output of rate change filter 216-3 may then be provided to spectrum allocation module 216-4. Spectrum allocation module 216-4 is configured to shift the spectrum of digital composite signal y'(t) to the updated locations, as provided by controller module 220-2. The output of individual spectrum allocation functions within spectrum allocation module 216-4 may then be combined using spectrum construction module 216-5. The combined spectrum may then be decoded using decoder module 218 to generate n digital signals $x'_1(t), x'_2(t) \ldots x'_n(t)$ representative of the originally-received n analog input signals.

Figure 4:
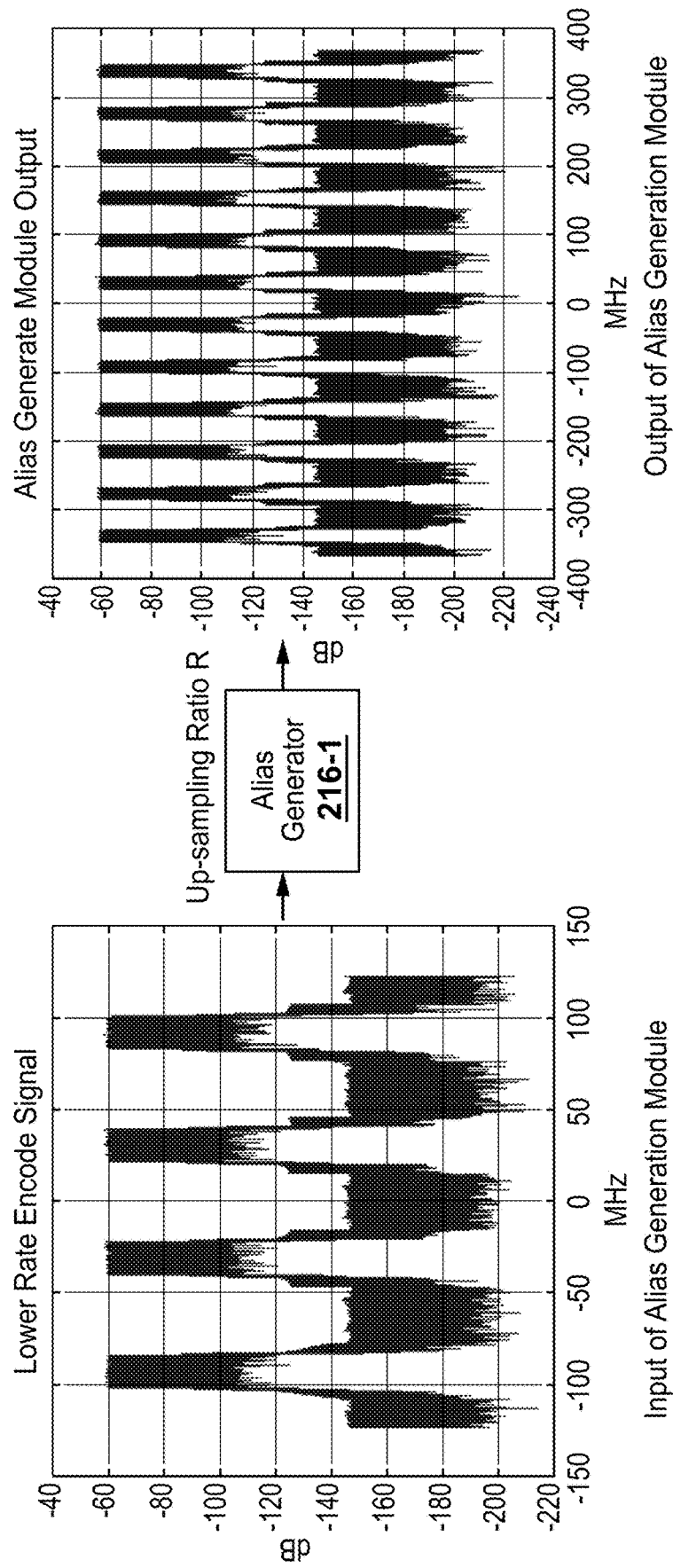
FIG. 4 depicts a high-level functional block diagram of a representative alias generator, in accordance with various embodiments of the present disclosure.

FIG. 4 illustrates a high level functional block diagram of alias generator module 216-1, in accordance with various embodiments of present disclosure. Alias generator module 216-1 is configured to perform up-sampling on received digital composite signal y'(t) either by inserting R−1 zeros in between two consecutive samples or by repeating individual sample R times. For instance, if the input to alias generator module 216-1 is y'(0), y'(1), y'(2) . . . y'(n) then the output of alias generator module 216-1 may be either y'(0), 0 0 . . . 0 y'(1) 0 0 . . . 0 y'(2), 0 0 . . . y'(n) or y'(0) y'(0) . . . y'(0) y'(1) y'(1) . . . y'(1) . . . y'(n) y'(n) . . . y'(n). The value of up-sampling ratio R is selected in accordance with the updated encoding rate and is provided by controller module 220-2.

FIG. 4 further depicts representative spectral properties of an exemplary input digital composite signal y'(t) and the corresponding output of the updated spectrum of digital composite signal y'(t). As shown, the updated spectrum of digital composite signal y'(t) exhibits the fundamental spectrum and spectral images of the received digital composite signal y'(t).

Figure 5:
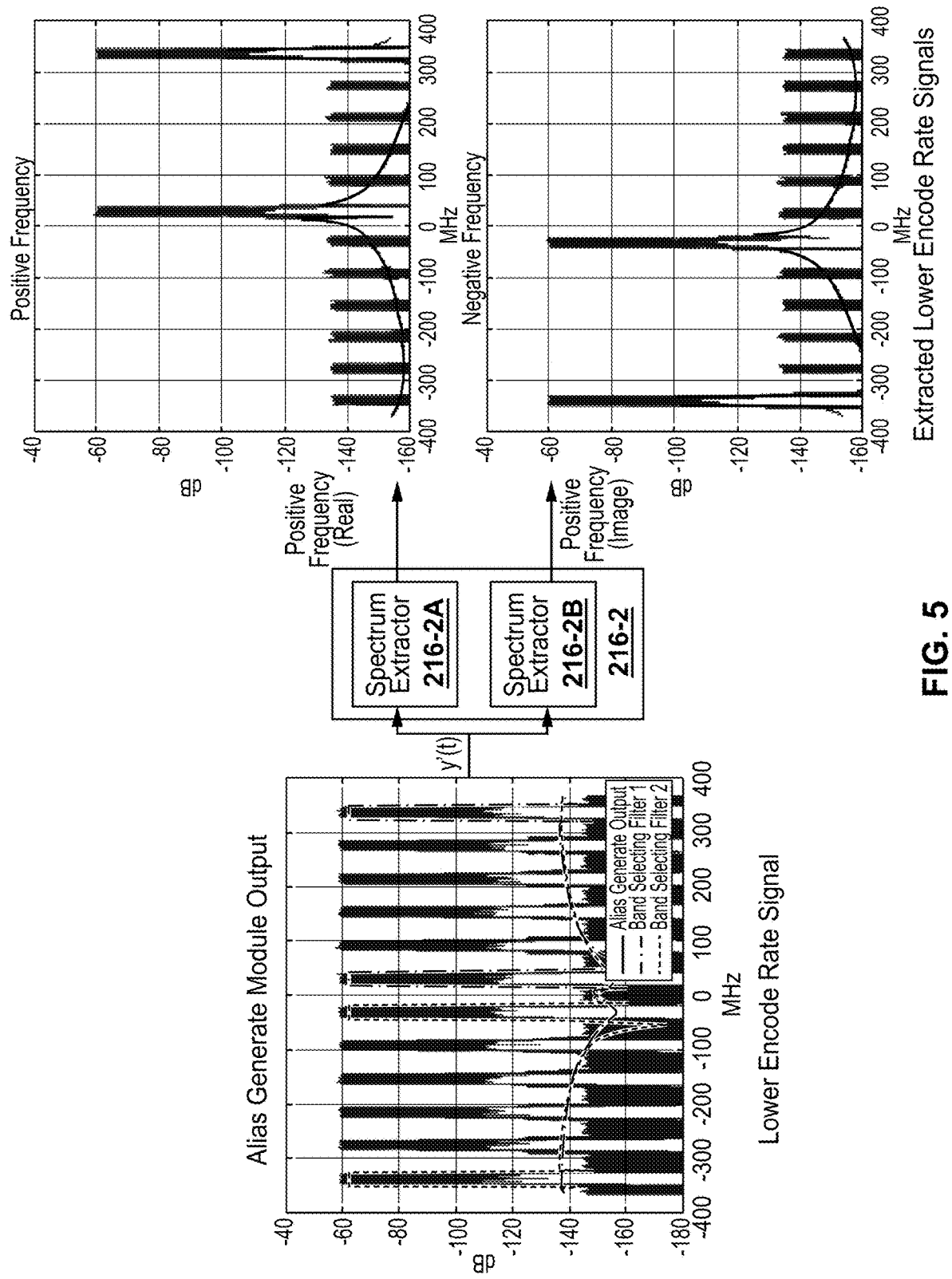
FIG. 5 depicts a high-level functional block diagram of a representative spectrum extractor, in accordance with various embodiments of the present disclosure.

FIG. 5 illustrates a plot of the signal strength (measured in dB) against frequency to show the spectral distribution of the signal at the input of the spectrum extractor 216-2, and at the outputs of the extractor 216-2. In the illustrated embodiment, spectrum extractor module 216-2 employs a spectrum extractor 216-2A and a spectrum extractor 216-2B. Each of spectrum extractor 216-2A and 216-2B further incorporates at least one of a multi-band selecting filter capable of extracting desired positive frequencies (real frequencies) and a multi-band selecting filter capable of extracting negative frequencies (image frequencies), from output of alias generator module 216-1. In the illustrated embodiment, Spectrum Extractor 216-2A makes use of a multi-band selecting filter for selecting the positive frequencies of the input signal while Spectrum Extractor 216-2B makes use of a multi-band selecting filter for selecting the negative or image frequencies of the input signal.

FIG. 5 further depicts representative spectral properties of updated spectrum of the aliased version digital composite signal y'(t) output by Alias Generator 216-1 which is provided as an input to 216-2. Spectrum Extractor 216-2 extracts the positive and negative spectra associated with digital composite signal y'(t).

It is to be understood that multi-band selecting filters may be designed based on type of codes used and the rate at which these codes are generated, for encoding and decoding of n analog input signals $x_1(t), x_2(t) \ldots x_n(t)$. The types of codes and the code rates determine the spectrum and the spectral locations to be selected from updated spectrum of digital composite signal y'(t). The design may also be based on signal bandwidth, out-band rejection ratio and image rejection attenuation requirements in order to successfully extract the desired spectrums and reject unwanted frequencies. To this end, controller module 220-2 may provide spectrum extractor 216-2A and 216-2B with band selection filter coefficients or other operating parameters.

Figure 6:
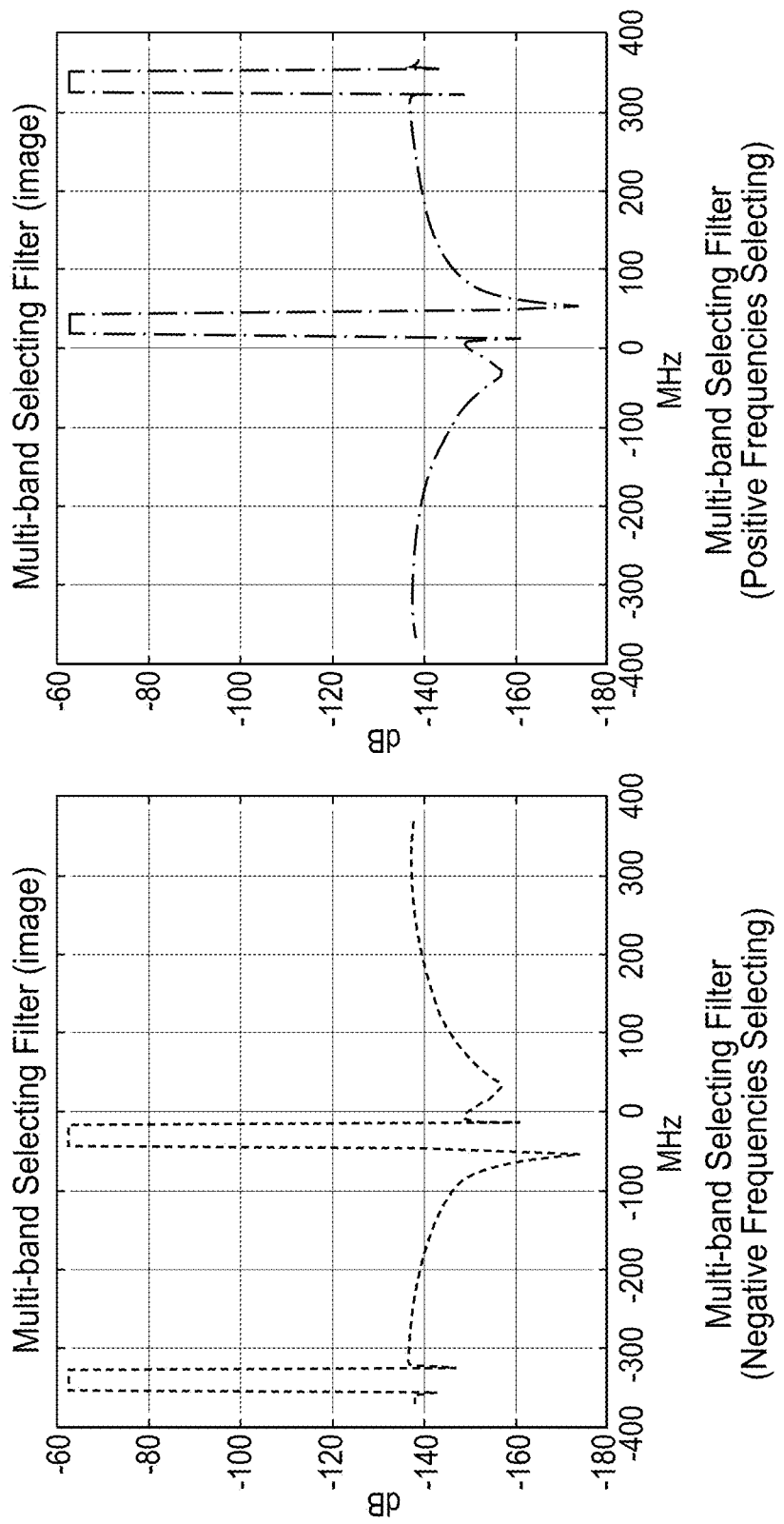
FIG. 6 depicts an exemplary representation of spectral properties of multi-band selecting filters, in accordance with various embodiments of the present disclosure.

Also, FIG. 6 illustrates representative spectral properties of two multi-band selecting filters. As shown, the extracted exemplary, desired positive and negative spectrum of digital composite signal y'(t) are selected in accordance with spectral properties of two multi-band selecting filters.

Figure 7:
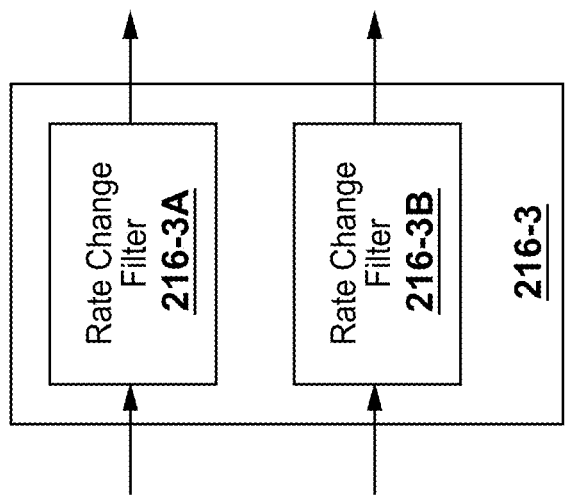
FIG. 7 depicts a high-level functional block diagram of a representative rate change filter, in accordance with various embodiments of the present disclosure.

Moving forward to FIG. 7 illustrating a high level functional block diagram of rate change filter module 216-3, in accordance with various embodiments of present disclosure. Rate change filter module 216-3 may employ a rate change filter 216-3A and a rate change filter 216-3B. The extracted desired positive spectrum of digital composite signal y'(t) by spectrum extractor 216-2A may then be forwarded to rate change filter 216-3A and the extracted desired negative spectrum of digital composite signal y'(t) by spectrum extractor 216-2B may then be forwarded to rate change filter 216-3B.

Rate change filter module 216-3 may operate to change the effective sampling rate of received signal in order to make the rate consistent with the desired sampling rate, provided by controller module 220-2. Further, the value of change in sampling rate may be an integer value or a non-integer value depending upon the ratio of desired sampling rate to the current sampling rate of the signal. It is to be understood that, rate change filter module 216-3 may employ any suitable, techniques directed to changing sampling rates, without departing from the principles presented herein.

One such technique, presented for the purposes of explanation of a non-limiting embodiment, utilized by rate change filter module 216-3, is interpolation of the received signal so as to increase the sampling rate of the received signal by an integer factor L. The sampling rate of the received signal may be expanded, either, by inserting L−1 zero-valued samples between the signal's existing data samples or by repeating individual sample L times, resulting in a signal having an intermediate sample rate L times the original sampling rate.

The interpolated signal may then be supplied to a suitable low pass or a band pass filter to remove images or high frequency noise introduced by the rate expansion. The filtered signal may then be decimated, so as to reduce the sample rate of the filtered signal by an integer factor M. The sampling rate of the received signal may then be reduced by removing M−1 data samples for every M data samples, resulting in an output signal having the desired sampling rate.

The output of rate change filter module 216-3 may be a resampled with the updated sampling rate as L/M. The value of L and M may depend on the ratio of required higher sampling rate and the current sampling rate of digital composite signal y'(t).

The rate change filter control parameters may be provided by controller module 220-2. Such control parameters may include, for example, change in rate parameters, rate change filter coefficients etc.

Figure 8:
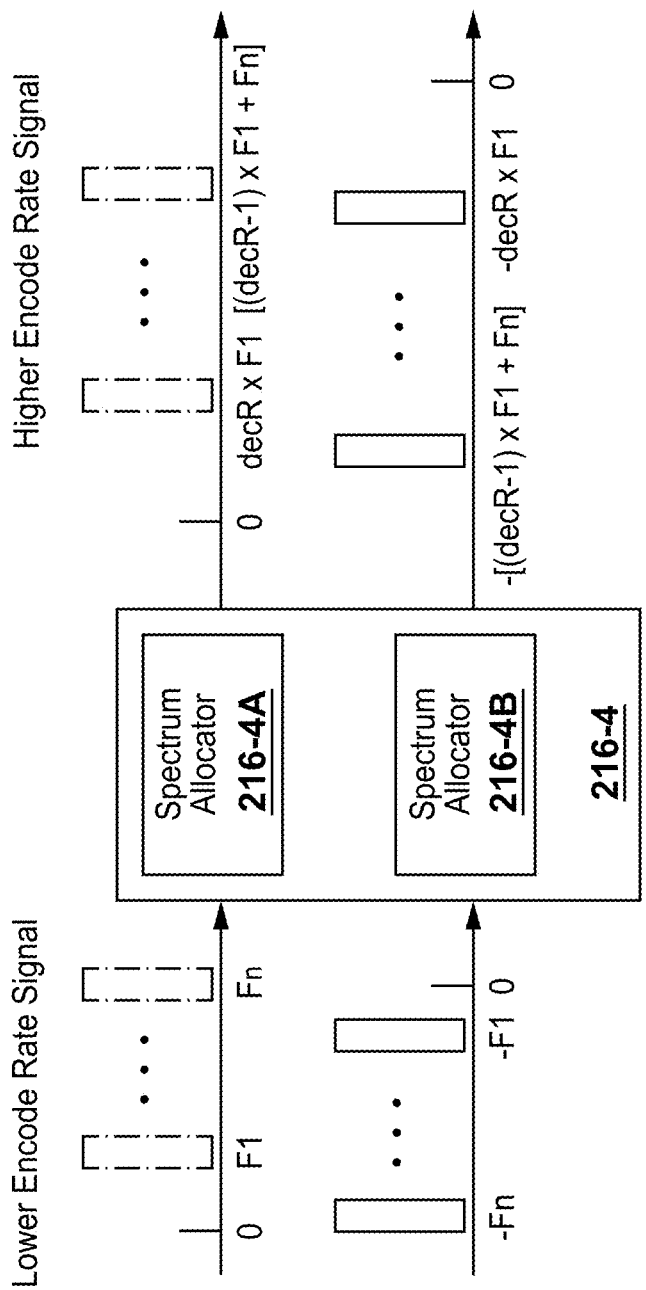
FIG. 8 depicts a high-level functional block diagram of a representative spectrum allocation module, in accordance with various embodiments of the present disclosure.

FIG. 8 illustrates a high level functional block diagram of spectrum allocation module 216-4, in accordance with various embodiments of present disclosure. Spectrum allocation module 216-4 employs a spectrum allocator 216-4A and a spectrum allocator 216-4B. The resample positive spectrum, output by rate change filter 216-3A is provided as an input to spectrum allocator 216-4A. Similarly, the resampled negative spectrum, output by rate change filter 216-3B is provided as an input to spectrum allocator 216-4B.

The output of rate change filter module 216-3 has a spectrum in which data is located at particular frequency locations. These frequency locations may not be situated in positions that are practical and accessible for other functions. Spectrum allocation module 216-4 operates to shift these frequency locations to make them consistent with the desired frequency location, as provided by controller module 220-2. The amount of shift in frequency locations may be an integer value depending upon the ratio of desired encoding rate, as provided by controller module 220-2, to the initial encoding rate at low-rate encoder module 202. In so doing, spectrum allocation module 216-4 may employ any suitable, techniques directed to shifting the frequency locations, without departing from the principles presented herein.

One such technique that may be utilized by spectrum allocation module 216-4 includes generating a tuning frequency and shifting the input signals by mixing the input signals with the generated tuning frequency. In one embodiment, spectrum allocator 216-4A generates a tuning frequency equal to $[(decR-1) \times F_1]$ and operates to shift all the frequency components in the resampled positive spectrum of digital composite signal y'(t) by $[(decR-1) \times F_1]$. Similarly spectrum allocator 216-4B generates a tuning frequency equal to $-[(decR-1) \times F_1]$ and operates to shift all the frequency components in resampled desired negative spectrum of digital composite signal y'(t) by $-[(decR-1) \times F_1]$. The term decR is used to represent the ratio of desired encoding rate, at variable high rate decoder module 214 to the initial encoding rate at low-rate encoder module 202 and $F_1$ is the central frequency of the lowest spectrum.

The spectrum allocation control parameters may be provided by controller module 220-2. Such control parameters may include, for example, individual spectrum shift frequency, and desired encoding rate.

FIG. 8 As shown in FIG. 8, central frequency of lowest positive spectrum $F_1$ is shifted to $[decR \times F_1]$ and central frequency of highest positive spectrum $F_n$ is shifted to $[(decR-1) \times F_1 + F_n]$ for positive frequencies. Similarly, central frequency of lowest negative spectrum $-F_n$ is shifted to $-[decR \times F_1]$ and central frequency of highest negative spectrum $-F_n$ is shifted to $-[(decR-1) \times F_1 + F_n]$ for positive frequencies. This should be understood to be the shift applied in the particular embodiment discussed above.

Figure 9:
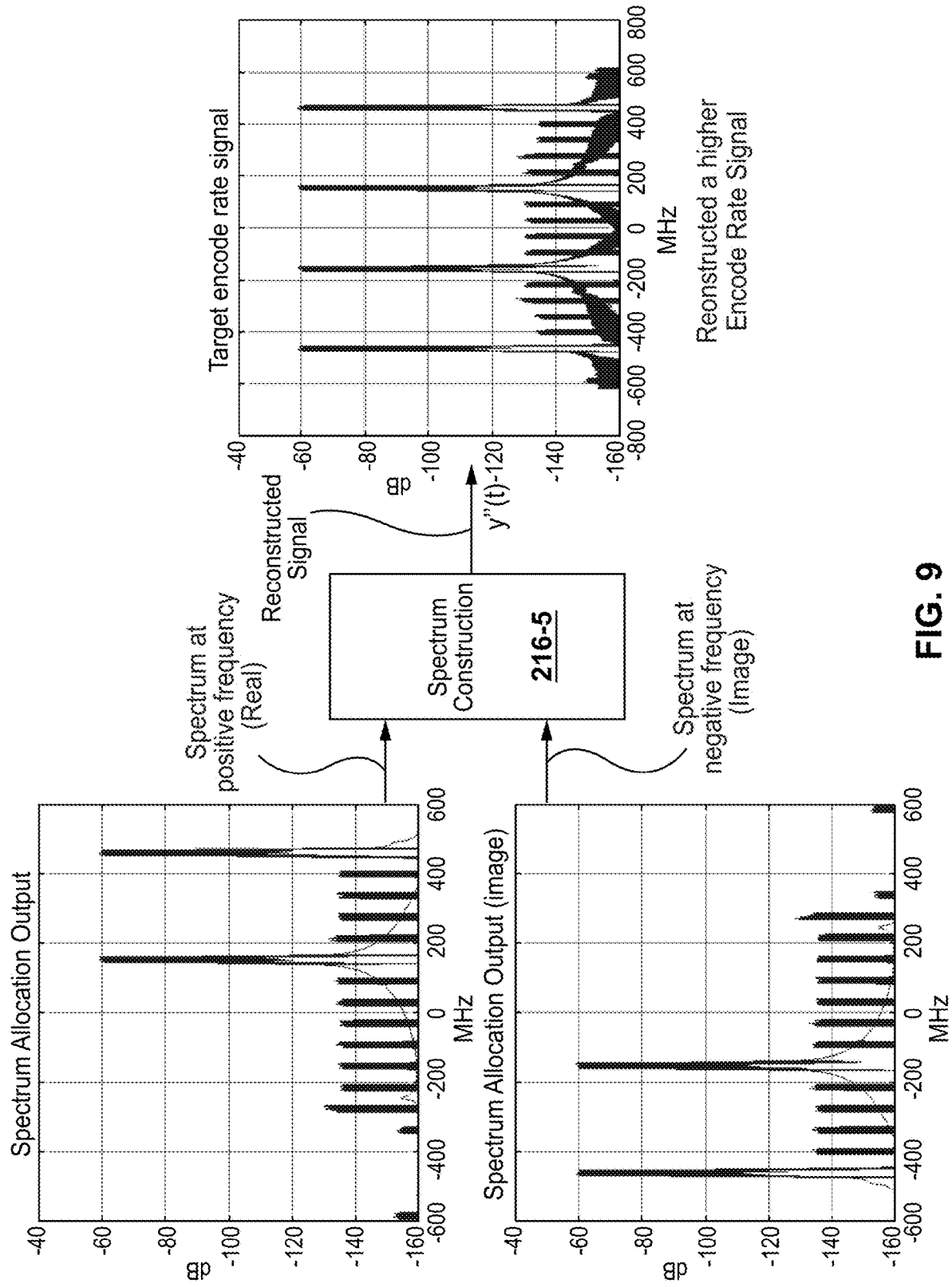
FIG. 9 depicts a high-level functional block diagram of a representative spectrum construction module, in accordance with various embodiments of the present disclosure.

Proceeding to FIG. 9, illustrating the inputs to and output from spectrum construction module 216-5, in accordance with various embodiments of present disclosure. Spectrum construction module 216-5 operates to combine the outputs from spectrum allocation module 216-4 to form a high encode rate digital composite signal y"(t). FIG. 9 further illustrates representative spectral properties of shifted positive and negative frequencies components of digital composite signal y'(t) before and after combining.

Going back to FIG. 3, the high encode rate digital composite signal y"(t) which is representative of a recombined version of the reconstructed signal components can then be provided as the output of Signal Reconstruction module 216. This output signal can be transmitted for further processing, such as, for example, decoding operations performed by decoder module 218. Decoder module 218 may further employ a bank of individual decoders 218-1, 218-2 . . . 218-N configured to decode the high encode rate digital composite signal y"(t) in order to separate the high encode rate digital composite signal y"(t) into constituent n digital signals $x'_1(t), x'_2(t) \ldots x'_n(t)$ representative of the originally-received n analog input signals. In so doing, decoder module 128 receives and processes the high encode rate digital composite signal y"(t) by mixing the high encode rate digital composite signal y"(t) with the spread-coding scheme at a higher rate as compared to the spread-coding scheme used by encoder 206, as provided by controller module 220-2. The resulting mixed samples may be then integrated to generate digital input signals $x'_1(t), x'_2(t) \ldots x'_n(t)$.

Decoder control parameters may be provided by controller module 220-2. Such control parameters may include, for example, high decoding rate.

Figure 10:
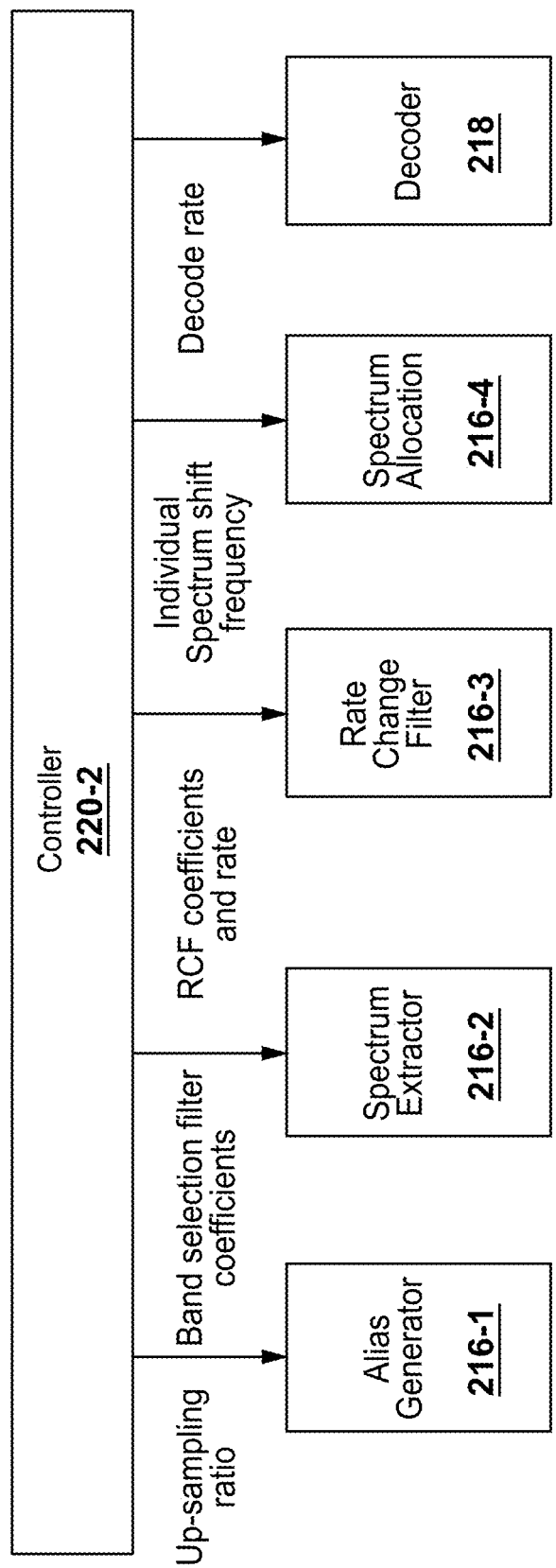
FIG. 10 depicts a high-level functional block diagram of a representative controller, in accordance with various embodiments of the present disclosure.

FIG. 10 is a block diagram of controller module 220-2, in accordance with various embodiments of present disclosure. Controller module 220-2 operates to provide control information and to configure various modules in variable high rate decoder module 214. In one embodiment, the spectrum of signals encoded in low-rate encoder module 202 may depend upon both the type of code and code rate used in the encoder, which may vary. Consequently, the up-sampling ratio R required by alias generator 216-1, and coefficients for use by the band selecting filters in spectrum extractor module 216-2 have to be configurable to be consistent with code type and rate used for encoding. Further, change in sampling rate and filter coefficients required by rate change filter 216-3 may be determined by a higher encoding rate. Also, individual spectrum shift frequency/tuning frequency required by spectrum allocation module 216-4 may depend upon higher encoding rate.

It is to be understood, various modules of variable high rate decoder module 214 and decoder module 218 may be required to be configurable. The control parameters used to configure these modules can be supplied by controller module 220-2 to ensure proper module functionality and hence, enabling the variable-rate decoder-based wireless receiver 200 to operate at different encoding and decoding rates, adding flexibility to construct a configurable and variable rate decoder based wireless receiver 200.

Figure 11:
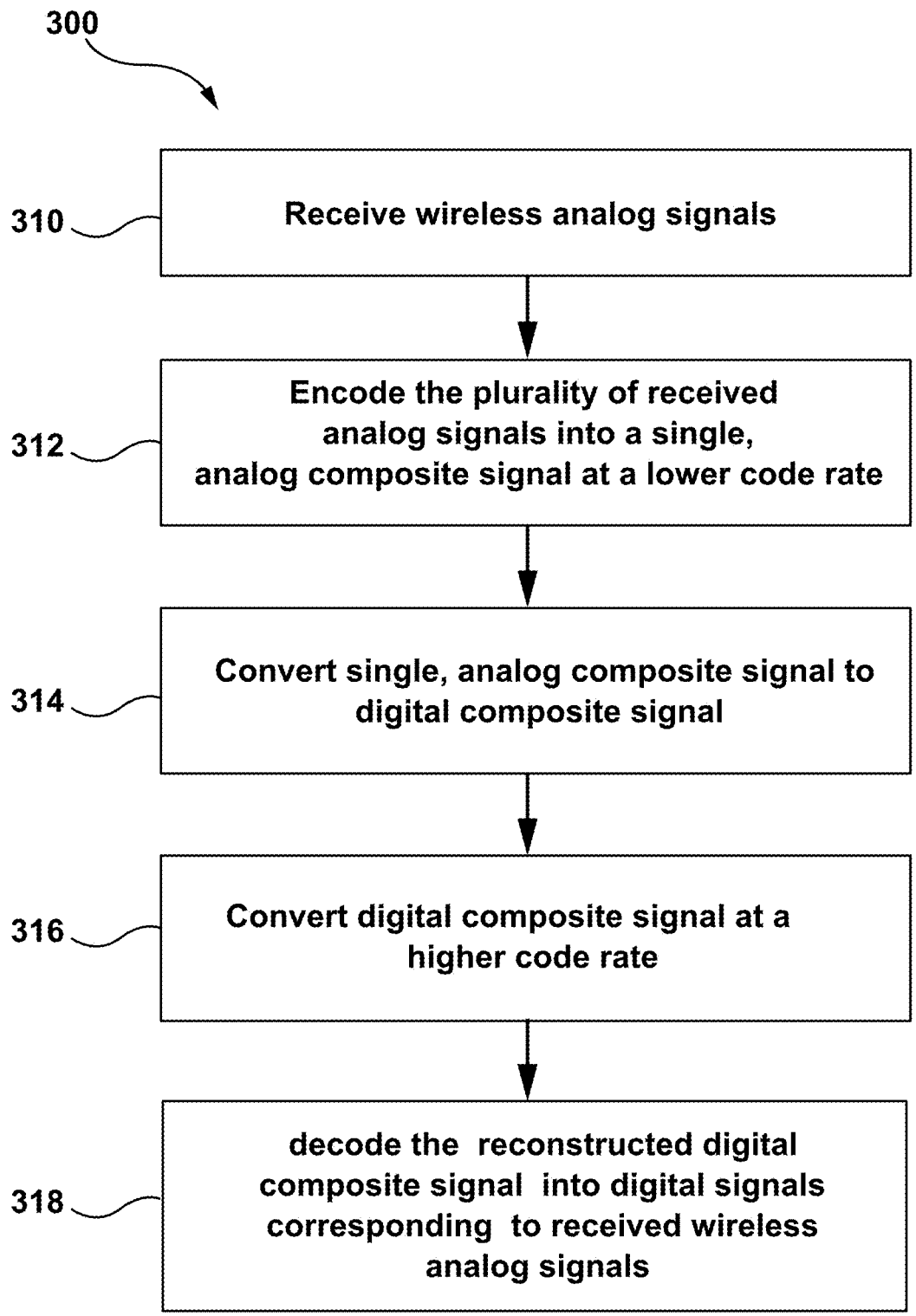
FIG. 11 depicts a functional flow diagram of a method for execution by a variable rate decoder based wireless receiver, in accordance with various embodiments of the present disclosure.

FIG. 11 depicts a functional flow diagram of process 300 directed to variable-rate decoder-based wireless receiver processing, in accordance with various embodiments of the present disclosure.

As shown, process 300 begins at task block 310, in which variable-rate decoder-based wireless receiver 200 receives a plurality of analog signals containing desired information content. As noted above, receiver 200 may include one or more antenna structures operative to receive the analog signals and the received analog signals may possess different modulation/encoding attributes.

Process 300 proceeds to task block 312, where receiver 200 down converts the frequency components of the plurality of received signals to an intermediate frequency (IF) and then encodes the IF-shifted plurality of received signals into a single analog composite signal y(t), based on a coding scheme having a lower code rate than the required. As noted above, down converter module 204 operates to down convert and supply the plurality of received signals to encoding module 206. In turn encoding module 206 operates to mix and combine multiple received signals with the low-rate spread-coding scheme, to output a single, composite analog signal y(t).

At task block 314, receiver 200 filter analog composite signal y(t) to restrict the bandwidth of interest and mitigate signal components that may lead to aliasing effects and convert the filtered to analog composite signal y(t) to digital composite signal y'(t). That is, as described above, filter module 210 may performs anti-aliasing filtering on analog composite signal y(t) and ADC module 212 may performs analog-to-digital conversion to generate digital composite signals y'(t).

Process 300, advances to task block 316, where receiver 200 operates to convert digital composite signal y'(t) by encoding digital composite signal y'(t) at a higher code rate to generate high encode rate digital composite signal y"(t). That is, as described above, alias generator module 216-1 may generate fundamental spectrum and spectral images of the received digital composite signal y'(t). Spectrum extractor module 216-2 may then extracts the spectrum in accordance with updated encoding rate. The sampling rate of extracted spectrum of digital composite signal y'(t) may then be changed by rate change filter module 216-3, to make the sampling rate consistent with the decoding rate. Spectrum allocation module 216-4 may then shifts the spectrum of digital composite signal y'(t) to the updated locations. The output of spectrum allocation module 216-4 may then be combined using spectrum construction module 216-5 to generate high encode rate digital composite signal y"(t).

Finally, at task 318, receiver 200 operates to decode high encode rate digital composite signal y"(t) to output digital signals corresponding to the received analog signals containing the desired content. As previously described, decoder module 218 operates to decode and recover the encoded signal information by mixing digital composite signals with coding scheme having a higher code rate as compared to the spread-coding scheme used by encoder 206, to produce digital signals corresponding to the received analog signals containing the desired content.

Thus, by virtue of the variable-rate decoding techniques employed by variable-rate decoder-based wireless receiver 200, hardware/software processing speeds are reduced, lower-bandwidth resources may be implemented, and power consumption is decreased.

It is to be understood that the operations and functionality of the variable-rate decoder-based wireless receiver, constituent components, and associated processes may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A wireless receiver, comprising:
a signal encoder configured to encode a plurality of received analog signals into a single encoded analog composite signal, in accordance with an orthogonal coding scheme operated at a first code rate;
an analog-to-digital converter configured to convert the single encoded analog composite signal into a single encoded digital composite signal containing constituent digital signals; and
a variable high rate decoder configured to:
convert the single encoded digital composite signal into a high encode rate digital composite signal in accordance with the orthogonal coding scheme operated at a second code rate;
generate fundamental spectrum and spectral images of the single encoded digital composite signal;
extract desired positive frequency spectrum and a desired negative frequency spectrum from the fundamental spectrum and the spectral images of the single encoded digital composite signal in accordance with the second code rate;
change a sampling rate of the desired positive frequency spectrum and the desired negative frequency spectrum;
perform a shifting operation on the desired positive frequency spectrum and the desired negative frequency spectrum in accordance with a tuning frequency;
combine the shifted, desired positive frequency spectrum and the shifted, desired negative frequency spectrum; and
decode the high encode rate digital composite signal in accordance with the orthogonal coding scheme operated at the second code rate, to output a plurality of digital signals containing a desired information content of the received plurality of analog signals.

2. The wireless receiver of claim 1, wherein the signal encoder, further comprises plurality of down convertors operative to shift frequency components associated with the plurality of received analog signals in accordance with an intermediate frequency.

3. The wireless receiver of claim 1, further comprising a filter to minimize aliasing effects of the single encoded analog composite signal.

4. The wireless receiver of claim 1, wherein the first code rate is lower than the second code rate.

5. The wireless receiver of claim 1, wherein the variable high rate decoder is further configured to perform up-sampling on the single encoded digital composite signal in accordance with the second code rate.

6. The wireless receiver of claim 1, wherein the variable high rate decoder further comprises a first multi-band filter and a second multiband filter, wherein the first multi-band filter configured to extract the desired positive frequency spectrum and the second multi-band filter configured to extract the desired negative frequency spectrum.

7. The wireless receiver of claim 1, wherein the change of sampling rate depends on the second code rate and may be an integer or a fractional value.

8. The wireless receiver of claim 1, wherein the variable high rate decoder is further configured to perform the shifting operation on the desired positive frequency spectrum and the desired negative frequency spectrum in accordance with the ratio of the second code rate to the first code rate.

9. The wireless receiver of claim 1, further comprising a controller configured to provide control signal parameters to the signal encoder, and the variable high rate decoder.

10. The wireless receiver of claim 9, wherein the control signal parameters include on or more of the following: code type, code rate, up-sampling ratio, sampling rate, intermediate frequency, tuning frequency, and filter coefficient(s).

11. A method of processing wireless received signals, comprising:

receiving a plurality of analog signals;

encoding the plurality of received analog signals into a single encoded analog composite signal in accordance with an orthogonal coding scheme operated at a first code rate;

converting the single encoded analog composite signal into a single encoded digital composite signal containing constituent digital signals;

converting the single encoded digital composite signal into a high encode rate digital composite signal in accordance with the orthogonal coding scheme operated at a second code rate;

generating fundamental spectrum and spectral images of the single encoded digital composite signal;

extracting a desired positive frequency spectrum and a desired negative frequency spectrum from fundamental spectrum and spectral images of the single encoded digital composite signal in accordance with the second code rate;

changing a sampling rate of the desired positive frequency spectrum and the desired negative frequency spectrum;

shifting the desired positive frequency spectrum and the desired negative frequency spectrum in accordance with a tuning frequency;

combining the shifted, desired positive frequency spectrum and the shifted, desired negative frequency spectrum; and decoding the high encode rate digital composite signal in accordance with the orthogonal coding scheme having the second code rate, to output a plurality of digital signals containing a desired information content of the received plurality of analog signals.

12. The wireless processing method of claim 11, further comprising shifting frequency components associated with the plurality of received analog signals in accordance with an intermediate frequency.

13. The wireless processing method of claim 11, further comprising filtering the single encoded analog composite signal to minimize aliasing effects.

14. The wireless processing method of claim 11, wherein the first code rate is lower than the second code rate.

15. The wireless processing method of claim 11, wherein generating of the fundamental spectrum and spectral images of the single encoded digital composite signal is performed by up-sampling the single encoded digital composite signal in accordance with the second code rate.

16. The wireless processing method of claim 11, wherein the extraction of the desired positive frequency spectrum and the desired negative frequency spectrum is performed by a first multi-band filter and a second multi-band filter respectively.

17. The wireless processing method of claim 11, wherein the change of sampling rate depends on the second code rate and may be an integer or a fractional value.

18. The wireless processing method of claim 11, wherein the shifting operation on the desired positive frequency spectrum and the desired negative frequency spectrum is performed in accordance with the ratio of the second code rate to the first code rate.

19. The wireless processing method of claim 11, further comprising providing control signal parameters for controlling of encoding, reconstructing, and decoding operations.

20. The wireless processing method of claim 11, wherein the control signal parameters include on or more of the following: code type, code rate, up-sampling ratio, sampling rate, intermediate frequency, tuning and filter coefficient(s).

* * * * *